C. COLAHAN.
Grain-Binder.

No. 215,265. Patented May 13, 1879.

WITNESSES
Wm. A. Skinkle
Roberdeau Buchanan

INVENTOR
Charles Colahan
By his Attorneys
Baldwin, Hopkins, & Peyton

UNITED STATES PATENT OFFICE.

CHARLES COLAHAN, OF CLEVELAND, OHIO.

IMPROVEMENT IN GRAIN-BINDERS.

Specification forming part of Letters Patent No. 215,265, dated May 13, 1879; application filed November 29, 1878.

*To all whom it may concern:*

Be it known that I, CHARLES COLAHAN, of Cleveland, Cuyahoga county, and State of Ohio, have invented a new and useful Improvement in Automatic Grain-Binders; and I do hereby declare the following to be a specification of the same.

The invention relates to improved devices for securing the grain in sheaves, and passing the band around the same, and pressing it in snug compact bundles on the platform of the receiver; and it consists in placing the devices to gather, and place the band, and compress the gavel upon a vibratory reciprocating arm or pendulous support, said arm being attached to an overhanging bracket, beneath which the grain passes in process of being bound. To the lower end of said arm I attach the gaveling device, and the band-carrying arm is pivoted to said vibratory arm, while I have attached to said band-carrying arm a supplemental arm to assist in closing and opening said arm in its work of passing the band around and gathering the sheaf. Said supplemental arm is attached at its upper end to a reciprocating pin, secured in and actuated by the hollow sliding block, through which the main supporting-arm is passed. Said supplemental arm has a slot at its upper end, through which the pin is free to travel in its vertical movements, permitting said band-carrying arm to be closed during the gathering and the binding of the bundle, while at the point of releasing the bundle the supplemental arm will raise the gaveling-arm from the bundle, sustaining said gaveling-arm while in its forward movement to gather the loose grain and bind the same prior to discharging the last bound sheaf, that the loose grain may not be scattered.

The compressing-arm, against which the grain is pressed by the gaveling-arm, is elastic, and may be secured in any desirable manner.

The gaveling-arm may be locked while inclosing the gavel with any of the simple devices easily attached thereto. In the present instance I have attached a spring from a point above to the upper end of said gaveling-arm.

The devices embodying this invention are actuated by the crank, and consist in the combination of the several devices as shown in the accompanying drawings, to which I will now refer for a more particular description.

Figure 1:
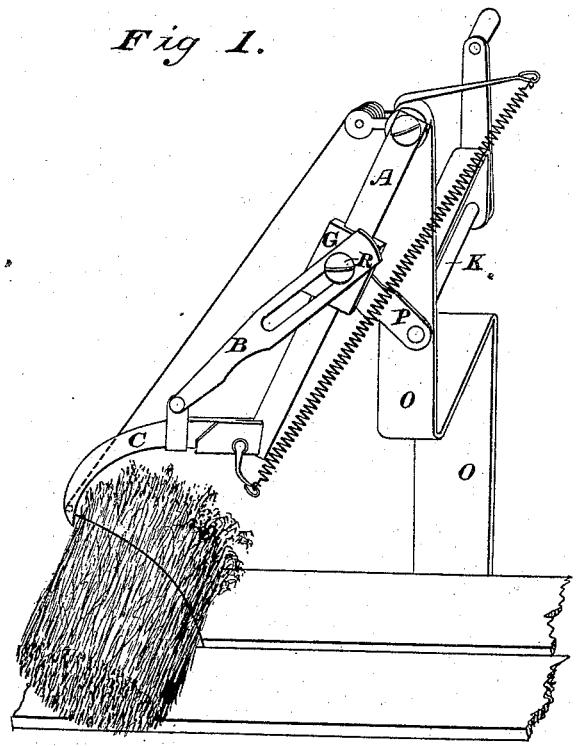
Figure 2:
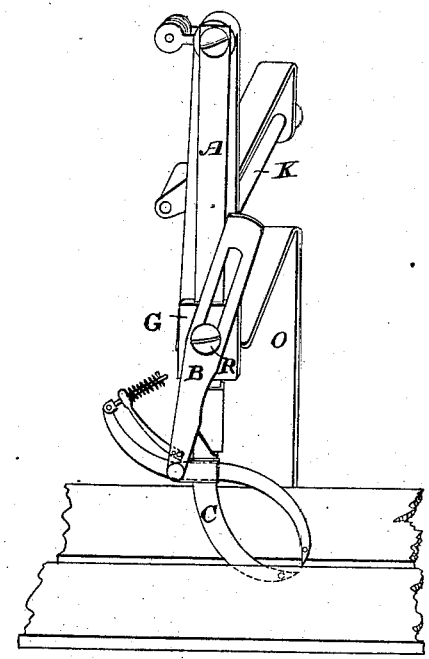
Figure 3:
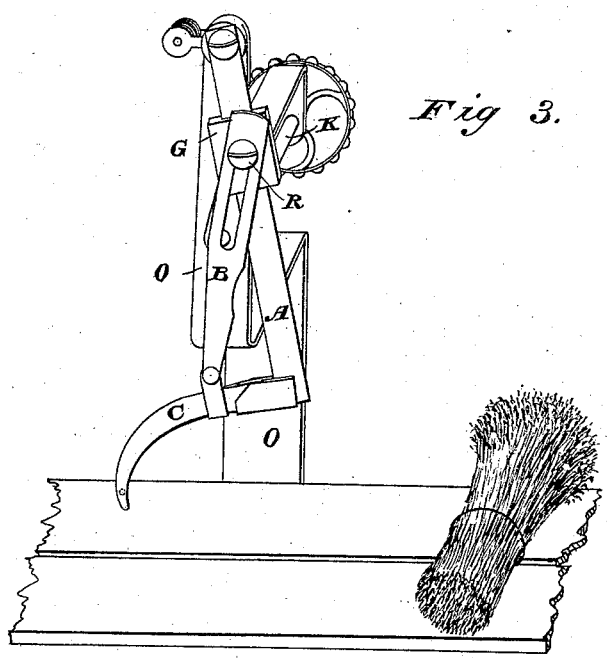

Figure 1 represents the gaveling-arm in the process of gathering the grain and passing the band around the same previous to securing its ends by mechanism located below the table or receiver. Fig. 2 represents the arms and compressor closed, as in bringing the grain back, and while the same is in the grasp of the gaveling-arm and compressor. Fig. 3 represents the gaveling-arm as it is passing away from the bound sheaf, leaving the bundle upon the table.

K represents the shaft, which is secured in overhanging frame O, said frame O being attached to the receiver of the harvester and actuated from the crank or sprocket-wheel that derives its motion from the main harvester by means of a chain or equivalent device.

To the inner end of said shaft is attached a crank, P, connected by a pivot to a hollow block, G, and through which block the swinging pendulum or vibrating support A receives its motion.

B is a supplemental arm, pivoted to the band-carrying arm, and is actuated by a pivot, R, secured in the sliding block G, and traveling in the slot or aperture in the arm to close and open the gaveling-arm C.

A locking device may be attached, extending from a point on the vibrating pendulum A to the gaveling-arm C, to lock the band-carrying and gaveling device during the binding process, and unlock the same to release the gavel after it is bound at each terminus of the movement of said arm in its reciprocation, while the crank may aid in the tripping of said locking device, and thus dispense with the long spiral spring.

The operation of my invention will be readily understood by the above description.

I claim and desire to secure by Letters Patent—

1. The combination, substantially as hereinbefore set forth, of the supporting-frame, the pendulous vibrating arm, the band-carrying arm pivoted thereto, the supplemental arm pivoted to the band-carrying arm, and having a sliding connection with the vibrating arm, and the actuating-crank.

2. The combination of the overhanging shaft K, its crank pivoted to the sliding block, the vibratory arm passing through said block or receiving motion therefrom, and the band-carrying arm and the supplemental slotted arm, substantially as shown and described.

CHAS. COLAHAN.

Witnesses:
JOHN H. WHIPPLE,
FREDERICK C. GOODWIN.